United States Patent
Desai et al.

(10) Patent No.: US 6,936,201 B2
(45) Date of Patent: Aug. 30, 2005

(54) SURFACE COVERINGS CONTAINING FUSED RECYCLED MATERIAL AND PROCESSES OF MAKING THE SAME

(75) Inventors: Peter Desai, Cartersville, GA (US); Hao A. Chen, Chadds Ford, PA (US); Nicholas Zerebecki, Mullica Hill, NJ (US)

(73) Assignee: Mannington Mills, Inc., Salem, NJ (US)

( * ) Notice: Subject to any disclaimer, the term of this patent is extended or adjusted under 35 U.S.C. 154(b) by 298 days.

(21) Appl. No.: 09/948,294

(22) Filed: Sep. 7, 2001

(65) Prior Publication Data

US 2002/0025414 A1 Feb. 28, 2002

Related U.S. Application Data

(62) Division of application No. 09/243,124, filed on Feb. 3, 1999, now Pat. No. 6,316,075.
(60) Provisional application No. 60/073,718, filed on Feb. 4, 1998.

(51) Int. Cl.[7] .......................... B29C 67/04; B29C 67/24
(52) U.S. Cl. ....................... 264/112; 264/115; 264/123; 264/125; 264/460
(58) Field of Search ............................... 264/460, 109, 264/112, 115, 122, 123, 125, 126; 428/95

(56) References Cited

U.S. PATENT DOCUMENTS

| | | | |
|---|---|---|---|
| 2,537,311 A | 1/1951 | Lyon | 18/5 |
| 2,574,588 A | 11/1951 | Piperoux | 18/6 |
| 2,960,727 A | 11/1960 | Bradshaw et al. | 18/55 |
| 3,012,901 A | 12/1961 | Reese | 117/21 |
| 3,078,510 A | 2/1963 | Rowe | 18/11 |

(Continued)

FOREIGN PATENT DOCUMENTS

| | | |
|---|---|---|
| DE | 19 28 405 | 12/1969 |
| DE | 1 794 184 | 2/1973 |
| DE | 2 319 254 | 4/1973 |
| DE | 4118276 A1 | 12/1992 |
| DE | 4136444 A1 | 5/1993 |
| DE | 4225027 C1 | 7/1993 |
| DE | 94 21 584 U1 | 5/1996 |
| EP | 1006201 | 7/1963 |
| EP | 1 098 946 | 2/1968 |
| EP | 0 046 526 | 2/1987 |
| EP | 0 518 014 A1 | 4/1992 |
| EP | 0 590 189 A1 | 9/1992 |
| EP | 0 595 063 A1 | 10/1993 |
| EP | 000604897 A1 | 7/1994 |
| EP | 0 867 557 A2 | 9/1998 |
| FR | 2 159 418 | 6/1973 |
| GB | 1339329 | 11/1962 |
| JP | 52-49280 | 4/1977 |
| JP | 61063783 | 4/1986 |
| JP | 93-012678 | 11/1992 |
| JP | 06040278 | 2/1994 |
| JP | 07032520 | 2/1995 |
| JP | 09220156 A | 8/1997 |
| US | 5481786 | 1/1996 |
| WO | WO 9312285 A1 | 6/1993 |
| WO | WO 94/16138 | 7/1994 |
| WO | WO 97/27242 | 7/1997 |

Primary Examiner—Cheryl A. Juska
(74) Attorney, Agent, or Firm—Kilyk & Bowersox, P.L.L.C.

(57) ABSTRACT

A backing or an intermediate layer for a surface covering is described which comprises a fused recycled material, wherein the material comprises a thermoplastic material, for instance, a vinyl material from a vinyl backed carpet or vinyl backed carpet manufacturing waste or both. Surface coverings containing the backing or intermediate layer of the present invention are also described as well as methods of making the backing or intermediate layer and methods of making the surface coverings containing the backing or intermediate layer of the present invention.

22 Claims, 3 Drawing Sheets

U.S. PATENT DOCUMENTS

| | | | |
|---|---|---|---|
| 3,223,027 A | 12/1965 | Soda et al. ................... | 100/93 |
| 3,231,457 A | 1/1966 | Meissner ................... | 161/151 |
| 3,367,261 A | 2/1968 | Kashiwagi ................... | 100/93 |
| 3,399,426 A | 9/1968 | Weasel, Jr. ................... | 18/12 |
| 3,400,186 A | 9/1968 | Wiley ................... | 264/126 |
| 3,488,411 A | 1/1970 | Goldman ................... | 264/24 |
| 3,607,999 A | 9/1971 | Corbett ................... | 264/25 |
| 3,617,590 A | 11/1971 | Neukomm ................... | 264/37 |
| 3,700,483 A | 10/1972 | Gentach et al. ................... | 117/65.2 |
| 3,754,065 A | 8/1973 | Hofmann et al. ................... | 264/70 |
| 3,764,247 A | 10/1973 | Garrett et al. ................... | 425/224 |
| 3,801,250 A | 4/1974 | Kaiser et al. ................... | 425/224 |
| 3,852,387 A | 12/1974 | Bortnick et al. ................... | 264/40 |
| 3,883,624 A | 5/1975 | McKenzie et al. ................... | 364/37 |
| 3,942,927 A | 3/1976 | De Mets ................... | 425/135 |
| 3,942,929 A | 3/1976 | De Mets ................... | 425/143 |
| 3,994,648 A | 11/1976 | Kornylak et al. ................... | 425/150 |
| 4,002,114 A | 1/1977 | Guttinger ................... | 100/49 |
| 4,008,030 A | 2/1977 | Ampler ................... | 425/224 |
| 4,017,657 A | 4/1977 | Foley et al. ................... | 428/95 |
| 4,020,020 A | 4/1977 | Appleyard et al. ................... | 260/23 |
| 4,028,159 A | 6/1977 | Norris ................... | 156/94 |
| 4,029,839 A | 6/1977 | Lesti ................... | 428/306 |
| 4,037,013 A | 7/1977 | Sprague ................... | 428/310 |
| 4,043,719 A | 8/1977 | Jones ................... | 425/115 |
| 4,105,593 A | 8/1978 | Stavrinou ................... | 260/2.3 |
| 4,128,369 A | 12/1978 | Kemerer et al. ................... | 425/113 |
| 4,189,291 A | 2/1980 | Longhi ................... | 425/215 |
| 4,213,748 A | 7/1980 | Ahrweiler ................... | 425/371 |
| 4,216,179 A | 8/1980 | Lamberts et al. ................... | 264/25 |
| 4,225,643 A | 9/1980 | Lilley ................... | 428/207 |
| 4,234,366 A | 11/1980 | Brewer et al. ................... | 156/79 |
| 4,238,176 A | 12/1980 | Cottrell, Jr. et al. ................... | 425/85 |
| 4,239,715 A | 12/1980 | Pratt ................... | 264/70 |
| 4,241,192 A | 12/1980 | Goswami ................... | 521/73 |
| 4,254,068 A | 3/1981 | Otsuka ................... | 264/37 |
| 4,254,074 A | 3/1981 | Toyooka et al. ................... | 264/132 |
| 4,311,657 A | 1/1982 | Koster ................... | 264/171 |
| 4,363,771 A | 12/1982 | Murray ................... | 264/119 |
| 4,375,350 A | 3/1983 | Sato ................... | 425/371 |
| 4,396,566 A | 8/1983 | Brinkmann et al. ................... | 264/70 |
| 4,508,771 A | 4/1985 | Peoples, Jr. et al. ................... | 428/95 |
| 4,563,320 A | 1/1986 | Morgan ................... | 264/151 |
| 4,615,853 A | 10/1986 | Aoyama et al. ................... | 264/122 |
| 4,689,102 A | 8/1987 | Prawdzik et al. ................... | 156/235 |
| 4,689,256 A | 8/1987 | Slosberg et al. ................... | 428/95 |
| 4,826,560 A | 5/1989 | Held ................... | 156/498 |
| 4,844,766 A | 7/1989 | Held ................... | 156/309.9 |
| 4,956,140 A | 9/1990 | Rolles et al. ................... | 264/280 |
| 4,956,222 A | 9/1990 | Matsuura et al. ................... | 428/212 |
| 4,966,801 A | 10/1990 | Becker et al. ................... | 428/113 |
| 4,981,876 A | 1/1991 | Grimmer ................... | 521/46.5 |
| 5,075,057 A | 12/1991 | Hoedl ................... | 264/115 |
| 5,076,870 A | 12/1991 | Sanborn ................... | 156/73.1 |
| 5,091,133 A | 2/1992 | Kobayashi et al. ................... | 264/119 |
| 5,106,534 A | 4/1992 | Wason et al. ................... | 252/350 |
| 5,106,555 A | 4/1992 | Kobayashi et al. ................... | 264/112 |
| 5,106,558 A | 4/1992 | Kobayashi et al. ................... | 264/119 |
| 5,143,675 A | 9/1992 | Yamamoto et al. ................... | 264/171 |
| 5,145,626 A | 9/1992 | Bastiloi et al. ................... | 264/112 |
| 5,171,501 A | 12/1992 | Yamamoto et al. ................... | 264/171 |
| 5,200,129 A | 4/1993 | Kobayashi et al. ................... | 264/119 |
| 5,224,367 A | 7/1993 | Ahrweller et al. ................... | 72/53 |
| 5,240,530 A * | 8/1993 | Fink ................... | 156/94 |
| 5,272,182 A | 12/1993 | Burnell ................... | 521/85 |
| 5,272,967 A | 12/1993 | Held ................... | 100/93 |
| 5,286,436 A | 2/1994 | Funk et al. ................... | 264/210 |
| 5,288,349 A | 2/1994 | Fink ................... | 156/72 |
| 5,298,209 A | 3/1994 | Pagani et al. ................... | 264/105 |
| 5,385,951 A | 1/1995 | Soderberg ................... | 521/98 |
| 5,391,585 A | 2/1995 | Grohman ................... | 521/139 |
| 5,395,576 A | 3/1995 | Blauhut et al. ................... | 264/166 |
| 5,415,917 A | 5/1995 | Tesch ................... | 428/102 |
| 5,460,764 A | 10/1995 | Held ................... | 264/123 |
| 5,466,320 A | 11/1995 | Burt et al. ................... | 156/244 |
| 5,472,763 A | 12/1995 | Schwarz et al. ................... | 428/95 |
| 5,481,786 A | 1/1996 | Smith et al. ................... | 28/107 |
| 5,494,628 A * | 2/1996 | Beyer et al. ................... | 264/125 |
| 5,494,723 A | 2/1996 | Erren et al. ................... | 428/95 |
| 5,497,949 A | 3/1996 | Sharer ................... | 241/76 |
| 5,498,667 A | 3/1996 | David et al. ................... | 525/166 |
| 5,518,188 A | 5/1996 | Sharer ................... | 241/14 |
| 5,532,035 A | 7/1996 | Corbin et al. ................... | 428/95 |
| 5,535,945 A | 7/1996 | Sferrazza et al. ................... | 241/24.12 |
| 5,538,776 A | 7/1996 | Corbin et al. ................... | 428/95 |
| 5,540,968 A | 7/1996 | Higgins ................... | 428/95 |
| 5,560,797 A | 10/1996 | Burt et al. ................... | 156/244 |
| 5,567,497 A | 10/1996 | Zegler et al. ................... | 428/95 |
| 5,576,031 A | 11/1996 | Uchida et al. ................... | 425/130 |
| 5,578,357 A | 11/1996 | Fink ................... | 428/95 |
| 5,578,648 A | 11/1996 | Beyer et al. ................... | 521/45.5 |
| 5,589,260 A | 12/1996 | Ben Zvi et al. ................... | 428/327 |
| 5,591,802 A * | 1/1997 | David et al. ................... | 525/66 |
| 5,604,009 A | 2/1997 | Long et al. ................... | 428/95 |
| 5,626,912 A | 5/1997 | Hendrix et al. ................... | 427/288 |
| 5,630,896 A | 5/1997 | Corbin et al. ................... | 156/72 |
| 5,645,967 A | 7/1997 | Sato et al. ................... | 430/110 |
| 5,719,198 A | 2/1998 | Young et al. ................... | 521/40 |
| 5,728,444 A | 3/1998 | Fink ................... | 428/97 |
| 5,728,741 A | 3/1998 | Zegler et al. ................... | 521/40 |
| 5,914,353 A * | 6/1999 | Grizzle et al. ................... | 521/40 |
| 6,059,207 A * | 5/2000 | Costello et al. ................... | 241/24.12 |
| 6,387,967 B2 * | 5/2002 | Muzzy et al. ................... | 521/48 |

* cited by examiner

SURFACE COVERINGS CONTAINING FUSED RECYCLED MATERIAL AND PROCESSES OF MAKING THE SAME

This application is a divisional of U.S. application Ser. No. 09/243,124 filed Feb. 3, 1999, now U.S. Pat. No. 6,316,075, which is a continuation-in-part of U.S. Provisional Application No. 60/073,718, filed Feb. 4, 1998, which is incorporated in its entirety by reference herein.

BACKGROUND OF THE INVENTION

The present invention relates to backings for surface coverings, and more particularly relates to backings which contain recycled material as well as methods of making such products and incorporating them into surface coverings.

At the present time, most of the post-consumer vinyl backed carpets and carpet manufacturing waste go to landfills or are destroyed by other means such as burning. With the environment being of a global concern, the disposal of vinyl backed carpets and manufacturing waste which is currently done is not an acceptable option.

Further, recycling of vinyl backed carpets has been attempted but at most, manufacturers have taken recycled material and reduced it to liquid plastisol form in order to form a carpet backing with conventional coating and curing processes. However, such a process has limitations in that only very small amounts of recycled material can be incorporated into a plastisol mix, such as about 5% or less by weight, and because the oil absorption of recycled material is very high, high levels of plasticizers in plastisols are needed which can lead to further problems. With high levels of plasticizers and plastisols, further processing by conventional methods can become difficult, if not impossible.

Thus, there is a desire by manufacturers to develop ways to use recycled material like carpet backing, such that large amounts of recycled material can be incorporated into products.

SUMMARY OF THE PRESENT INVENTION

A feature of the present invention is to provide a material. e.g., a surface covering, that can contain up to 100% recycled material in one or more components or layers.

Another feature of the present invention is to provide a backing for a surface covering containing recycled material.

An additional feature of the present invention is to provide a surface covering containing a backing or intermediate layer which uses up to 100% recycled material.

A further feature of the present invention is to provide a method of making a backing from recycled material and incorporating the backing into surface coverings.

Additional features and advantages of the present invention will be set forth in part in the description which follows, and in part will be apparent from the description, or may be learned by the practice of the present invention. The objectives and other advantages of the present invention will be realized and attained by means of the elements and combinations particularly pointed out in the written description and appended claims.

To achieve these and other advantages and in accordance with the purposes of the present invention, as embodied and broadly described herein, the present invention relates to a backing or an intermediate layer for a surface covering which contains a fused recycled powder. The recycled powder contains at least a thermoplastic material and the backing or intermediate layer can optionally include other materials, including virgin thermoplastic materials.

The present invention further relates to a surface covering which contains the backing described above.

The present invention, in addition, relates to a method of making a backing or intermediate layer for a surface covering and includes the steps of applying at least recycled powder to a substrate to form a layer, where the recycled powder contains at least one thermoplastic material; and fusing the recycled powder to form a continuous backing or intermediate layer.

It is to be understood that both the foregoing general description and the following detailed description are exemplary and explanatory only and are intended to provide a further explanation of the present invention, as claimed.

The accompanying drawings, which are incorporated in and constitute a part of this application, illustrate embodiments of the present invention and together with the descriptions serve to explain the principles of the present invention.

DETAILED DESCRIPTION OF THE PRESENT INVENTION

Figure 1:
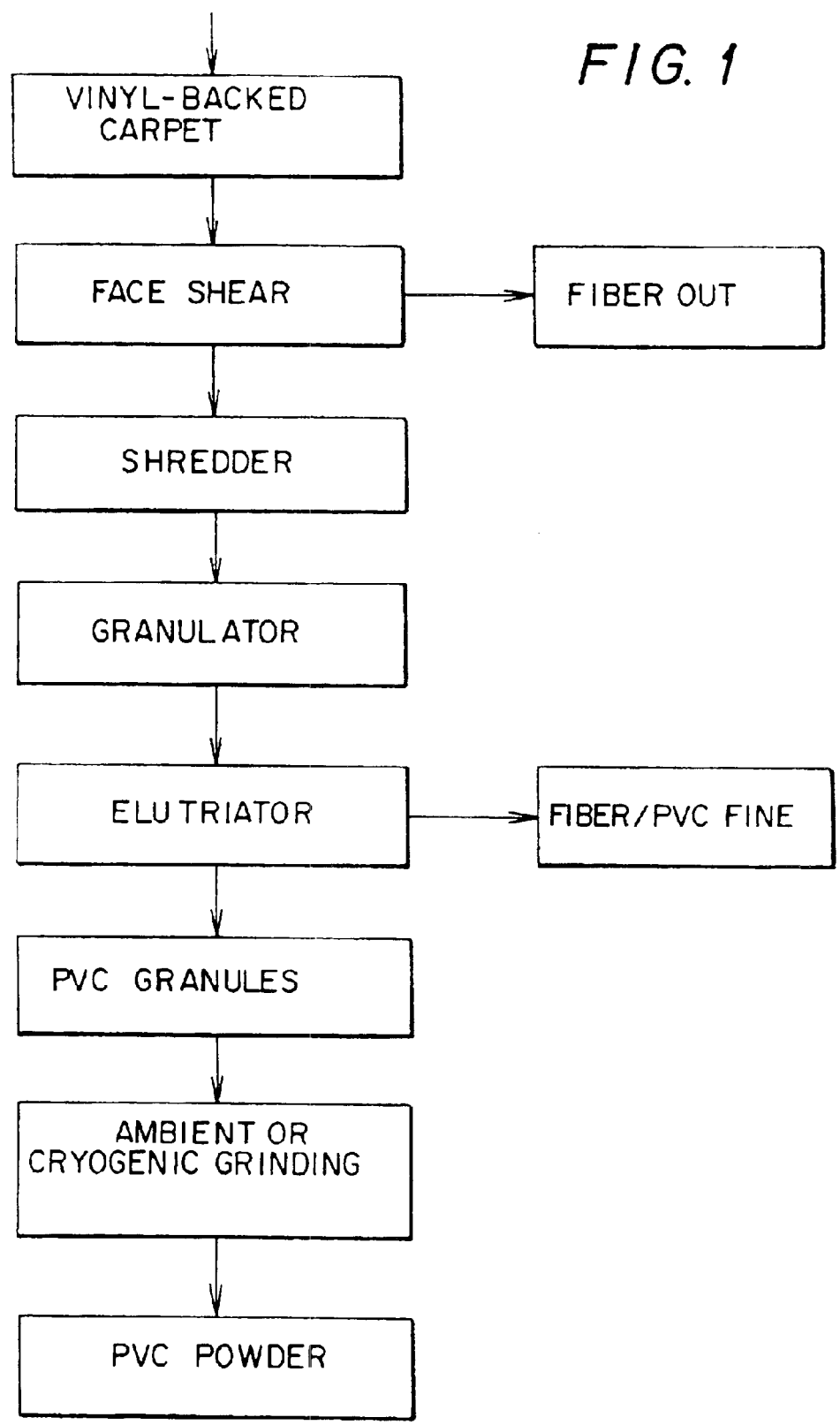
FIG. 1 is a flow chart showing one embodiment of a method of the present invention.

The present invention relates to a backing (also known as a backing layer) and can be a secondary backing or an Intermediate backing layer for a surface covering. In one embodiment, the backing layer or intermediate layer contains at least a fused recycled material. The recycled material contains at least one thermoplastic material. Various coatings or layers are discussed herein, and unless stated otherwise, are preferably of a substantially uniform thickness and can be applied using techniques known to those skilled in the art.

For purposes of the present invention, a surface covering can be any surface covering which makes use of a backing and/or intermediate layer, such as a floor covering, wall covering, ceiling covering, countertop covering, and the like. Examples of floor coverings include, but are not limited to, textile substrates, such as carpets, and resilient flooring, such as vinyl flooring or vinyl surface coverings. Particularly preferred examples of textile substrates are hard backed and cushion backed textile substrates. While the present invention will be described with respect to the preferred embodiment which is floor coverings, and in particular textile substrates and resilient flooring, the present invention can be applied to other types of surface coverings containing backing and/or intermediate layers in view of the disclosure herein.

Preferably, the textile substrate is a broadloom carpet, modular tile, or a wide roll carpet (e.g. 6 ft. wide). Most preferably, the textile substrate is tile or 6 ft. roll goods.

The textile substrate comprises textile fibers defining a fibrous face, a primary backing to which the textile fibers are secured, and a secondary backing secured to the primary backing. For purposes of the present invention, the term "textile substrate" relates to, but is not limited to, a fiber, web, yarn, thread, sliver, woven fabric, knitted fabric, non-woven fabric, upholstery fabric, tufted carpet, and piled carpet formed, from natural and/or synthetic fibers.

The backing or backing layer for purposes of the present invention can be any layer or substrate which has one or more additional layers adhered to a surface of the backing layer. Thus, the backing can be the layer which is in contact with the sub-surface, such as a sub-floor, or can be an intermediate layer with other layers above and below the intermediate backing layer.

The recycled material, preferably a powder, contains at least one type of thermoplastic material. The recycled powder used in the present invention is preferably a powder obtained from post-consumer products which contain at least one thermoplastic material. Preferably, the post-consumer product is a carpet and/or carpet manufacturing waste, and more preferably is a vinyl backed carpet and/or vinyl backed carpet manufacturing waste. Preferably, substantially no thermosetting material is part of the recycled material (e.g. less than 5% by weight), and more preferably no thermosetting material is present with the recycled material.

With regards to the backing material, for purposes of the present invention, the backing is a thermoplastic material. The thermoplastic material can be an aliphatic thermoplastic resin such as one derived by polymerization or copolymerization of an ethylenically unsaturated monomer. The monomer can be a ethylenically unsaturated hydrocarbon such as an olefin or a nitrile (such as an acrylonitrile), vinyl or vinylidene chloride, vinyl acetate, or an acrylate, such as, ethylacrylate or methylmethacrylate. More particularly, the thermoplastic material can he a polyethylene, ethylene/vinyl acetate, polyvinyl chloride, polyisobutylene, and the like. Preferably, the thermoplastic material is a vinyl-type material such as a vinyl resin and more particularly a polyvinyl chloride-type material.

Thermoplastic materials are not subject to chemical change when heated. Thermoplastic materials are not infusible, consequently they will gel or soften when a solvent is applied. Suitable polymers for the backing layers of the present invention are derived from at least one monomer selected from the group consisting of acrylic, vinyl, chlorinated vinyl, styrene, butadiene, ethylene, butene, and copolymers or blends thereof. A preferred coating composition is a polymer or copolymer of a vinyl compound, e.g., polyvinyl chloride, polyvinylidine chloride, polyethylene chloride, polyvinyl acetate, polyvinyl acetal, and the like, and copolymers and mixtures thereof. A specific example of a resin coating composition is a vinyl chloride, resin-based plastisol, wherein the plasticizer component of the plastisol is a phthalate-based compound, such as an alkyl phthalate substituted one or two times with a linear or branched C5–C12 alkyl group, which is included in an amount by weight equal to between about 15 to 60 percent of the weight of the vinyl chloride resin component. Particular vinyl chlorides include Vinycel 124 (Policyd SA DE CV, Mexico), Geon Registered ™ 13 oz (Geon Company, Cleveland, Ohio), Pliovic—70 (The Goodyear Tire and Rubber Company, Akron, Ohio), and Oxy 67SF (Occidental Chemical Corp., Dallas, Tex.). Particular alkyl phthalate plasticizers include Santicizer Registered ™ 160 (Monsanto Company, Saint Louis, Mo.), Palatinol Registered ™ 711P (BASF Corporation, Parsippany, N.J.), and Jayflex DHP (Exxon Chemical America, Houston, Tex.).

The backing can be a cushion-back or a hard back backing. In more detail, the backing can be a solid thermoplastic backing or a foamed thermoplastic backing. Preferably, the thermoplastic foamed backing is a foamed vinyl backing, and more preferably a polyvinyl chloride foamed backing, such as a closed-cell vinyl foamed backing.

Generally, the backings will contain a sufficient amount of at least one blowing agent and plasticizer and can include other ingredients conventionally used in backings.

Chemically expanded thermoplastic foamed backings can he used as the secondary backing and can be prepared by casting a thermoplastic resin plastisol containing a blowing agent onto the back of the primary backing and heating to expand and fuse the plastisol. Alternatively, a pre-blown foamed secondary backing can be laminated, such as by heat, to the primary backing. The solid thermoplastic secondary backing can be similarly prepared by casting or by lamination.

Conventional blowing agents can he used and include, but are not limited to azodicarbonamite, oxybissulfonyl hydroxide, substituted thiatriazole, and the like such as the ones described in U.S. Pat. No. 3,661,691 incorporated its entirety by reference herein.

The recycled powder is obtained from post-consumer products by subjecting the product, such as a vinyl backed product, to a process which reduces the post-consumer product into a number of pieces (e.g., chunks or granules) which can eventually he further reduced in size to form a powder. One operation that can be used to reduce, for instance, the vinyl backed carpet or vinyl backed manufacturing waste, to a suitable recycled powder is to first subject the carpet or waste to a face shear operation to remove at least a portion, if not most of the face fiber that may he present. While this step is an optional step, it is preferred that at least a portion of the face fiber, and even more preferably at least 50% of the face fiber, and even more preferably at least 75% of the face fiber, be removed to improve the end use purity of the recycled material which eventually will be formed into a surface covering backing layer. While there are various types of devices which can remove the face fibers, like pure nylon fiber, which may be attached to the vinyl backed carpet, one preferred device is a shearing machine, such as one commercially available from Sellers, Inc., United Kingdom.

Whether or not any face fiber is removed from the vinyl backed carpet or vinyl backed manufacturing waste, the carpet or waste is then fed into a shredder which breaks down the carpet and waste into various pieces, chunks, or granules. The particular size of the pieces is not critical, so long as the carpet or waste is somehow "cut up" or formed into pieces so that the carpet or waste can eventually and preferably be reduced to powder form. Preferably, these chunks or granules have a diameter of about 4" or less, and more preferably have a diameter of about 3" or less, and most preferably have a diameter of about 2" or less. Preferably, the diameter range of these chunks or granules is from about 1" to about 2". One device that can be used to reduce the carpet and/or waste to such chunks or granules is a shredder, such as one commercially available from Nordfab, Inc., Model #1350K.

The chunks or granules are then reduced to a smaller size by subjecting them to any operation which can accomplish this purpose. For example, a granulator can he used; for instance, one available from Rapid Granulator, Model 3260 with a screen size of ¼ inch, which can reduce the chunks or granules to a size of about ½" or less, more preferably about ⅜" or less, and most preferably about ¼" or less. Preferably, the chunks or granules are reduced to a size of from about ½" to about ¼", more preferably from about ⅜ to about ¼". With the use of a granulator or similar device, the size of the resulting chunks or granules can be adjusted to any desired size and thus it is certainly within the bounds of the present invention to vary the size of the particles to sizes desired by the ultimate use of the recycled material.

The chunks or granules now reduced to a smaller size, are then optionally subjected to an operation which can separate substantially any existing fiber from the chunks or granules present. This fiber which may be present is generally face fibers and this operation preferably removes any low density fibers from the granules or chunks which are typically of a high density. One method of separating at least a portion of the fibers from the granules or chunks at this stage, is an aspirator using an air stream separation design. One machine capable of doing this separation is a KF-60 extended aspirator available from Kongskilde. In this optional step, it may be desirable to have a portion of the fiber remain with the granules or chunks of the recycled material or it may be desirable to remove almost all of the fiber, if not all of the fiber, depending upon the end use of the backing which will be formed from the recycled material.

The granules or chunks, which may have some fibers attached or present, are then preferably reduced in size to form a powder. Any means can be used to reduce the larger sized granules or chunks to a powder. Preferred ways of doing so is with the use of a grinder or cryogenic grinding process. If very fine powder is required for the particular end use, then a cryogenic grinding process is preferred which can be accomplished by spraying the granules or chunks of recycled material with liquid nitrogen and then subjecting the sprayed recycled material to a grinding process. The cryogenic process forms finer powder because of the brittleness of the material resulting from the liquid nitrogen treatment and because of the reduced agglomeration of the material during the grinding process. If the powder size is not as important, then an ambient grinding process can be used with any type of grinder such as a Wedco Therm-O-Fine UR-28 grinding system available from Wedco, Inc. Any size of recycled material can he used in the backing or intermediate layer, so long as the material can take the form of a backing or intermediate layer by fusing, which will be described in more detail below. It Is preferred that the recycled powder have a particle size of 3,000 microns or less and more preferably 1,000 microns or less. A preferred range of powder size would be from about 250 microns to about 1,500 microns, and a more preferred range would be from about 300 microns to about 900 microns. FIG. 1 summarizes the preferred steps of making the recycled powder.

The recycled powder upon analysis typically contains at least one thermoplastic material, such as a vinyl-based material, and can also contain at least one plasticizer, at least one inorganic filler, at least one stabilizer, and generally a small amount of face fibers, such as nylon, polypropylene, polyester, and/or glass fibers. These fibers which may he present can assist as acting like a reinforcement fiber material in the backing layer once the recycled powder is fused.

The recycled material, preferably in powder form, which is formed can be used alone to form a backing or intermediate layer or can be mixed with other conventional ingredients, such as virgin thermoplastic material to form the backing or intermediate layer. Any combination of the recycled material with virgin material is possible. For instance, from about 1% by weight recycled material to about 100% recycled material can be used along with from about 0% virgin material to about 99% by weight virgin material to form a mixture which can ultimately be fused into a backing layer or intermediate layer. Preferably, when forming the final backing layer, a backing layer containing about 100% recycled material is preferred. When an intermediate backing layer is formed, it is preferred that at least 10% by weight virgin thermoplastic material is also present with the recycled material, and more preferably at least about 50% by weight virgin thermoplastic material is present along with the recycled material, and most preferably at least about 90% by weight virgin thermoplastic material is present along with the recycled material.

Besides virgin thermoplastic material, other conventional ingredients can he present along with the recycled material to form a backing or intermediate layer, such as inorganic fillers, resins, plasticizers, stabilizers, foaming agents, blowing agents, and the like. The amount of any one of these ingredients can be the same as conventionally used by those skilled in the art in forming such layers. Since a foaming or blowing agent can be incorporated into the recycled material, a foam layer or cushion-backed layer can be formed with the recycled material of the present invention.

In forming the backing or intermediate layer, the recycled material, preferably powder, with or without additional ingredients or components, is applied onto a substrate in any manner in which powders can be applied to eventually form a continuous layer, which is preferably substantially uniform in thickness. The substrate can be a release paper, a belt, or preferably, the bottom surface of a primary backing or other layer in a carpet or other surface covering. Once the recycled powder with or without other ingredients or components is applied, preferably in a uniform or substantial uniform fashion, the recycled material is fused to form a continuous layer. Fusing or fused, for purposes of the present invention, is understood to mean that the recycled material, preferably a powder, is not completely reduced to a liquid state, like liquid plastisol, but instead, is the joining of the individual particles or granules of the recycled material, in any manner, preferably with the application of heat, to form a continuous layer. Generally, some of the recycled particles or granules, and preferably a majority, and most preferably over 90% of the recycled particles or granules substantially maintain their identity as particles on a macroscopic level, but are part of the continuous layer. In one embodiment of the present invention, after the recycled material has been fused to form a continuous layer, visually, one can identify many of the individual recycled particles in the backing layer. The fusing of the recycled material is preferably with the application of heat and pressure. More preferably, the fusing of the recycled material is accomplished with the use of a double-belt press such as one available from Schilling-Knobel of Germany.

Figure 2:
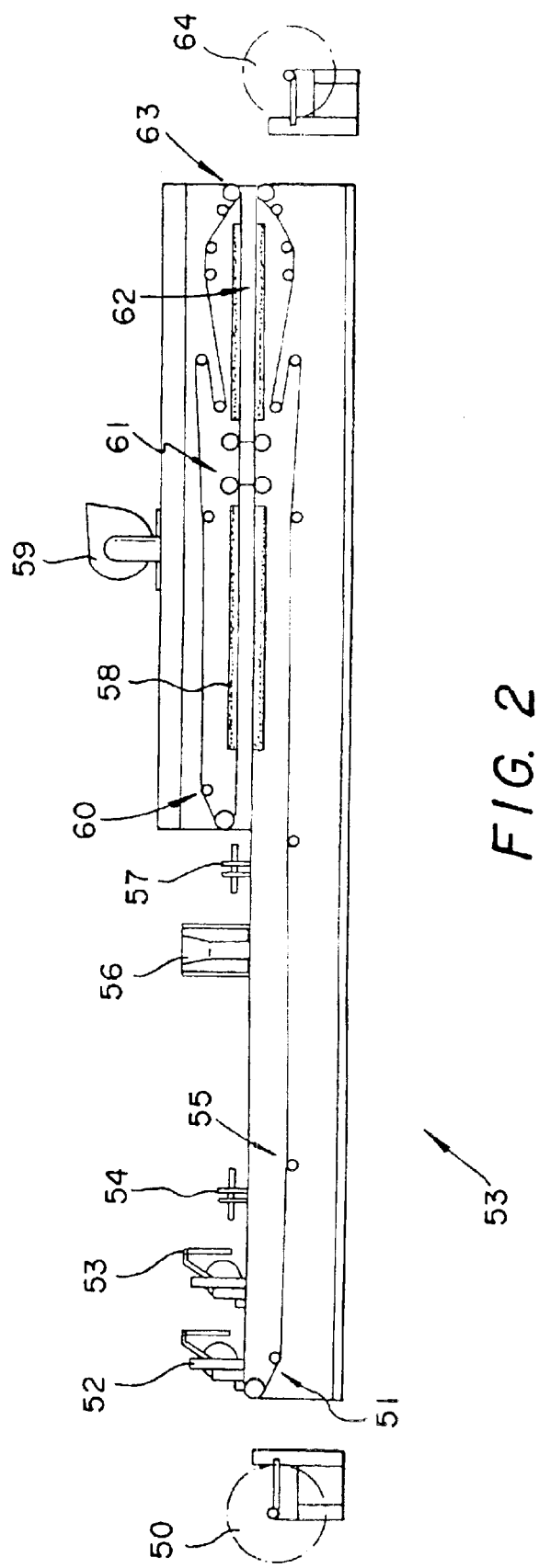
FIG. 2 is a schematic drawing showing the various steps of making a surface covering which includes a backing containing recycled material.
Figure 3A:
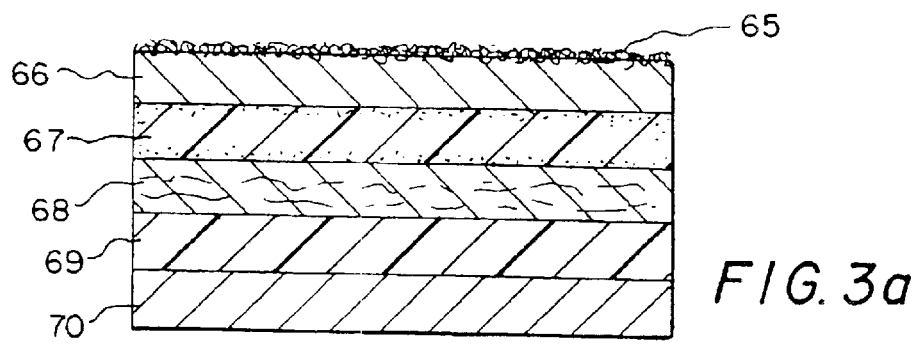
FIGS. 3a–e are cross-sectional views of surface coverings according to several embodiments of the present invention.
Figure 3B:
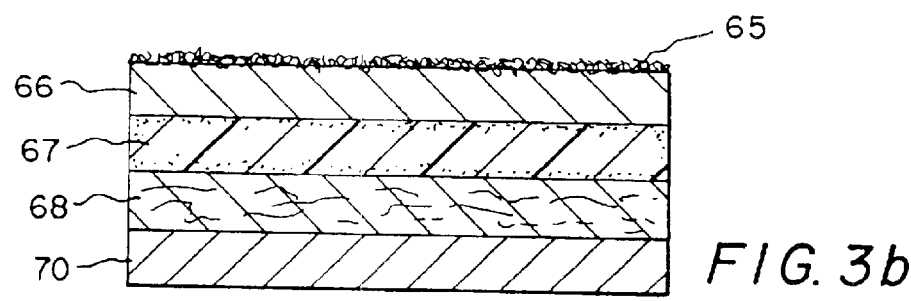
Figure 3C:
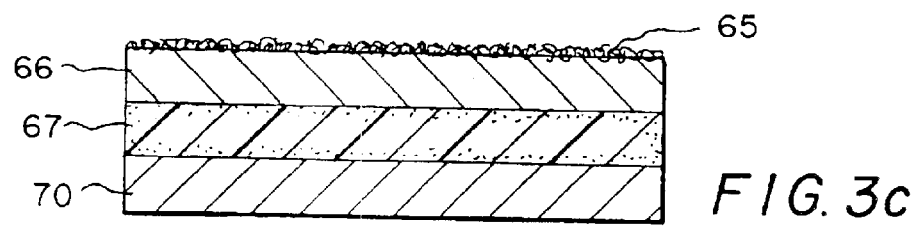
Figure 3D:
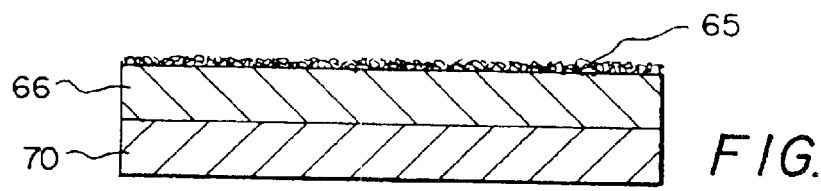
Figure 3E:
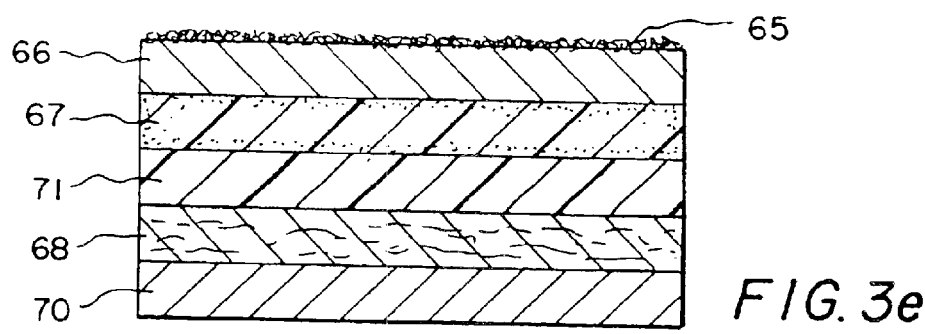

With a double-belt press, the recycled material and any other layers of the surface covering travel between a moving top belt and a moving bottom belt where heat is applied through each belt onto the recycled material. Generally, a heated platen is located above the top belt and below the bottom belt to provide the application of heat onto the belt and then onto the recycled material. This platen can also provide pressure onto the recycled material. Preferably, the heated platen provides up to about 100 psi and more preferably about 40 psi or less, and even more preferably about 0.1 psi to about 10 psi onto the recycled material. Most preferably, no pressure is applied onto the recycled material at this point. Preferably, any pressure that may be applied through the platens is at a consistent pressure. The temperature applied to the recycled material is generally a temperature sufficient to fuse the recycled particles of the recycled material together without causing any substantial melting of the recycled particles. The top belt is preferably maintained at a temperature of from about 215° C. to about 220° C. while the bottom belt which is the furthest away from the recycled material is preferably kept at a temperature of from about 110° C. to about 130° C. so as to avoid any damage to the other layers which may exist with the recycled material. Once the recycled material with or without other layers present is heated and fused, the material then preferably goes between two sets of nip rolls which apply a pressure of about 75 psi or less onto the material traveling on the belts and then the material goes through a cooling zone wherein cold water or other cooling medium is circulated through additional platens located above the top belt and below the bottom belt which cools the belt and cools the surface covering. Preferably, during the fusing stage, the pressure and temperature are held constant or substantially held constant. The material then can he rolled if desired onto a roller or fed into a cutter. FIG. 2 depicts a preferred process of making the surface covering with the use of a double belt press.

In a more preferred embodiment, a surface covering, in this case, a hard backed carpet can be made as follows. Unbacked carpet is placed on an unwinding station where this unbacked carpet is fed face down on a moving belt preferably the bottom belt of a double-belt press. The unbacked carpet can be a primary backing with textile fibers extending upwardly from the backing and forming a surface. With the carpet face down on the bottom belt of the double-belt press, an adhesive or polymeric pre-coat is applied, for instance, by applying a dispersion grade or suspension grade thermoplastic resin onto the primary backing or unbacked carpet. This adhesive or polymeric pre-coat layer can be a 100% virgin dry blend or can be a mixture of virgin material along with recycled material. In lieu of a dry blend, a liquid grade resin can be applied as the adhesive or polymeric pre-coat layer. Preferably, a dry blend is applied. The adhesive or polymeric pre-coat layer is applied in conventional amounts, but preferably the amount is from about 15 ounces per square yard to about 60 ounces per square yard. Preferably, the adhesive or polymeric pre-coat layer is a dry blend of at least one PVC resin, at least one plasticizer, and at least one stabilizer.

If the adhesive or polymeric pre-coat layer is a dry grade, the material along with the unbacked carpet is vibrated by a plate underneath the bottom belt which aids in the particles in the adhesive or polymeric pre-coat layer to fall between the fiber bundles and improves the dispersion of the particles on the unbacked carpet. The material can then he subjected to a process which will gel the adhesive or polymeric pre-coat layer, such as with the use of infrared heat. Then, a reinforcement material is applied onto the surface of the adhesive or polymeric pre-coat layer. Examples of reinforcement materials include, but are not limited to, a non-woven material or woven material, such as a non-woven fiber glass mat or fleece and the like. This reinforcement material is generally placed on the surface of the adhesive or polymeric pre-coat layer while the layer is still in a liquid or gel state. Prior to or after the reinforcement material is applied, an intermediate layer can be applied.

The intermediate layer can be formed from 100% recycled material or can contain lesser amounts of the recycled material or can contain 100% virgin material. Preferably, the intermediate layer contains at least 50% virgin material and more preferably at least 75% virgin material and most preferably at least 90% virgin material with the remaining balance being substantially recycled material. This intermediate backing layer is also an optional layer and can be made from the same material as the secondary backing layer. Preferably, the intermediate backing layer is a hard backed and is not a foamed layer. The intermediate layer is preferably a thermoplastic material and more preferably is a polymer or copolymer of a vinyl compound, such as polyvinyl chloride. The intermediate backing layer is preferably applied in the form of a dry blend but can be applied as a liquid coating. The intermediate backing layer whether applied as a dry blend or as a liquid coating can be applied in the manners conventionally known to those skilled in the art. Preferably, the amount of intermediate layer applied is an amount of from about 10 oz/yd$^2$ to about 150 oz/yd$^2$.

Once the reinforcement material is applied, the carpet can then be subjected to a suitable pressure to create a good bond between the individual fibers and/or yams the adhesive or polymeric or pre-coat layer as well as the reinforcement material with the pre-coat layer. An application of pressure of this sort can be applied by a pressure roller or other suitable device.

The unbacked carpet can then move to a station where the final backing is applied which preferably is from a 100% recycled powder. This material can he applied with the use of a scattering machine or other conventional application device just like the dry adhesive or polymeric pre-coat layer. Preferably, the recycled material powder is applied in an amount of from about 40 to about 150 ounces per square yard, and more preferably from about 70 to about 90 ounces per square yard, and most preferably about 80 ounces per square yard. As described above, the material, once substantially uniformly applied to the unbacked carpet, is then subjected to a fusing process. The carpet can then he subjected to a cooling zone also described previously and then rolled or fed to a cutter.

Referring to FIG. 2, an unwinding roll (50) contains release paper or the primary backing of a carpet or other layer which is unwound onto the lower belt (51) of the double belt system (53). A scattering machine (54) scatters powder containing the pre-coat ingredients which can contain recycled powder onto the material being unwound from (50), and the vibrating chute assists in evenly distributing the powder uniformly throughout the layer on the bottom belt. An infrared heater (54) is used to heat pre-coat material to gel or fuse the pre-coat material, and then fiberglass is applied to form a reinforcement layer and a crush roll (55) is used to crush the fiberglass onto the pre-coat layer. Afterwards, a scattering/cooling machine (56) is used to applied the secondary backing layer material which contains at least the recycled powder. Then, a second infrared unit (57) is used to heat the secondary backing material. A series of heating platens (58) is located above the upper belt (60) and below the bottom belt (51) and the heater (59) is used to heat the platens (58). Nip rolls (61) are used to press the material on the belt. Cooling platens (62) are then used above the upper belt (60) and below the bottom belt (51) to cool the material. Finally, a belt cleaning system (63) is used to remove debris from the belts and a rewinding roll (64) is used to roll the finished product.

FIGS. 3 a) through e) depict various embodiments of the preferred surface covering which is a textile product. In each embodiment in the Figure, fibers (65) are located on top and a secondary backing (70) is located at the very bottom of the covering and a primary backing layer (66) secures the fibers (65). A reinforcement layer (68) can be located beneath the pre-coat layer (67) and/or beneath an intermediate layer (71). An intermediate layer (69) can also be located beneath the reinforcement layer (68). In each case, each layer is affixed in some manner such as by casting, adhesive, or other means conventional in the art.

As an alternative to using the primary backing as the substrate in which all other layers are applied thereto, it is certainly within the bounds of the present invention to make any layer of the surface covering first and then add other desirable layers to the top and/or bottom surface of the first layer made. For instance, the secondary or final backing layer can be made first and then all layers applied thereto.

Besides the above embodiment relating to the use of recycled material in one or more layers of a surface covering, another aspect of the present invention is a surface covering wherein the secondary backing layer and preferably the adhesive or polymeric pre-coat layer are made from dry powder blends instead of liquid blends. The advantage with such a system would be that the powder blends are less expensive and are easier to handle in the manufacturing process. In such a process, the layers can be formed in the same manner described above with respect to the formation of a layer using recycled material such that the virgin material forming the secondary backing, or other layer will form a continuous layer by fusing or be subjected to sufficient heat to melt the powder to form a continuous layer. The use of the double-belt press described above would be preferred in forming a surface covering containing one or more layers from a dry powder blend. Preferably, the secondary backing would contain a dry blend of a polymeric resin such as polyvinyl chloride along with other optional conventional ingredients in a dry blend form, such as at least one plasticizer, at least one filler, at least one stabilizer, and the like. A foaming agent in the form of a dry blend can also be included. An intermediate backing layer and/or an adhesive or polymeric pre-coat layer can be formed in the same fashion as described earlier. It is within the bounds of the present invention to first form one layer and subject the dry powder blend in the shape of a layer to appropriate heat to form a continuous layer and then add a second layer in powder form to the top or bottom surface of the first formed continuous layer and so on. Alternatively, the layers can all he formed on top of each other in powder form and then subjected at one time to sufficient heat to form a continuous multi-layered surface covering.

Whether a surface covering contains recycled material or 100% virgin material, the process of curing all at one time is particularly preferred in making resilient vinyl flooring where all layers are first formed and then the entire surface covering is subjected to sufficient heat to form a multi-layered resilient vinyl flooring which can then have optional strengthening layers, wear layers and/or top coat layers applied afterwards, such as in the manner described in U.S. Pat. No. 5,458,953 incorporated in its entirety by reference herein.

In combination with the other embodiments of the present invention or as a separate alternative, the recycled material of the present invention can be added to the adhesive and/or pre-coat layer. In this embodiment, the adhesive and/or pre-coat layer are preferably applied as a liquid and the recycled material is added to the liquid in any fashion, such as by mixing with the liquid before the liquid is applied as a coat or the recycled material can be applied by introducing the recycled material on top of the liquid once the liquid is applied as a coat (e.g., applying the recycled material on top of the liquid coat by scattering techniques). Any amount of recycled material can be applied in this fashion, and preferably the amount is from about 1% by weight of the liquid coat to about 50% by weight, and more preferably, from about 5% to about 15% by weight of the liquid coat. Similarly, any intermediate layer or even the backing layer, such as the ones described above, can have recycled material introduced and present in the same manner (i.e., recycled material added to liquids which form the layer) as a separate alternative; meaning, the backing layer need not contain recycled material as long as some other layer(s) contains recycled material. More than one layer can contain recycled material and preferably, the entire surface covering has from about 1% by weight to about 20% by weight recycled material.

The present invention will he further clarified by the following examples, which are intended to be purely exemplary of the present invention.

EXAMPLES

Example 1

A surface covering, such as a final hard backed carpet was made in the following manner. A carpet was made in the same manner as described above with respect to the preferred embodiment of using an adhesive or polymeric pre-coat layer having the formula A described below in Table 1 and the use of a fiberglass fleece (1.0 lb–2.0 lb/100 ft$^2$, e.g. 1.4 lb/100 ft$^2$) obtained from Johns Manville. The unbacked carpet used was a 26 ounce loop obtained from Mannington Carpets-$\frac{1}{10}$ gauge. The final or secondary back coat was applied in powder form as shown in FIG. 2 using the preferred amounts and parameters described above in the preferred embodiment.

The final back coat was formula R. Formula R is recycled powder resulting from vinyl back carpet tile and carpet waste which was subjected to a face shear operation to remove substantially all of the fiber with a Sellers Shearing Machine. The sheared carpet tile and carpet waste were then fed into a Nordfab 1350K shredder to form 2" or less granules or chunks which were then reduced to a smaller size of ¼" or less with the use of a Rapid Granulator 3260. Low density fiber was separated out of the material with a Kongskilde KF-60 aspirator and the material was reduced to a powder having a size of from about 330 microns to about 850 microns. Table 2 below, sets forth the various parameters used in making the carpet which was constructed on a double-belt press obtained from Shilling-Knobel of Germany.

TABLE 1

| Chemical Type | Formulations Chemical | PHR |
|---|---|---|
| Co-Polymer Pre-Coat Formulation-(A-Powder) | | |
| PVC Resin | VC-113 | 100 |
| Flame Retardant | Aluminum Trihydrate | 120 |
| Plasticizers Blend | S-160 (60% by wt.) DINP (40%) | 22.5 |
| Stabilizer | Tile | 1.5 |
|  | Stearic Acid | 1.0 |
| Homo-Polymer PVC Back-Coat-(B-Powder) | | |
| PVC Resin | VC 57 | 100 |
| Filler | CaCO$_3$ | 180 |
| Plasticizer Blend | S-160 (60% by wt.) DINP (40%) | 60 |
| Stabilizer | Tile | 1.5 |
|  | Stearic Acid | 1.0 |
| Foam Backing Dry Blend Formulation-(F-Powder) | | |
| PVC Resin | Geon 438 | 100 |
| Flame Retardant | Aluminum Trihydrate | 60 |
| Filler | CaCO$_3$ | 60 |
| Plasticizer Blend | S-160 (60% by wt.) DINP (40%) | 70 |
| Stabilizer | Tile | 2.0 |
| Foaming Agent | AZ-120 | 2.4 |
| Activator | Kadox 920 | 1.0 |

TABLE 2

| Carpet Construction | Precoat Type | Precoat Weight gms/m² | Fiberglass fleece | Back Coat Type | Back Coat Weight gms/m² | Top Belt Heat | Bottom Belt Heat | Belt Speed m/min | Belt Gap mm | Infrared Both @ |
| --- | --- | --- | --- | --- | --- | --- | --- | --- | --- | --- |
| 26 oz Loop | A-Powder | 818 | Yes | Recycled Granules | 2724 | 215° C. | 130° C. | 2 | 8 | 50% |
| 26 oz Loop | A-Powder | 818 | Yes | Recycled Granules | 2724 | 215° C. | 130° C. | 2 | 8 | 70% |
| 26 oz Loop | A-Powder | 818 | Yes | Recycled Granules | 2724 | 215° C. | 130° C. | 2 | 8 | 60% |
| 26 oz Loop | A-Powder | 818 | Yes | Recycled Granules | 1090 | 215, 205, 195° C. | 90° C. | 2 | 8.5/10 | PC 60% BC 50% |

Example 2

A vinyl floor covering was made using the process of the present invention. In particular, on a belt, recycled material having Formula R was applied in an amount to create a 40 mil thick layer which on top was applied PVC pellets to form a second layer of 40 mils in thickness. Both layers, in powdered form, were then fused to form a continuous multi-layer product. A top coat containing an UV curable urethane-based acrylate thermoset from Lord Corporation was then applied in the manner described in U.S. Pat. No. 5,405,674, incorporated in its entirety by reference herein, to form the final product.

Example 3

A surface covering containing layers made from powder blends was made from using the double-belt press and procedure in Example 1. The process steps of Example 1 were followed except that in lieu of Formula R as the final backing layer, Formula B or Formula F were used to form the final backing layer.

Table 3 below sets forth some results from surface coverings made from Examples 1 and 3.

TABLE 3

| | Example | | | |
| --- | --- | --- | --- | --- |
| | 1A | 3A | 3B | 1B |
| Radiant Panel (ASTM E-648) | .70 | — | .78 | .56 |
| NBS Smoke FL (ASTM E-662) | 474 | 444 | 515 | 435 |
| Tuft Bind Dry (ASTM D-1335) | 7.8 | 9.9 | 2.5 | 6.6 |
| Tuft Bind Wet (ASTM D-1335) | 6.4 | 7.4 | 1.5 | 5.4 |
| Delamination (ASTM D-3936) | No | No | No | — |
| Flatness (ITTL Test-5 means carpet totally "hugs" the floor) | 4 | — | 2–3 | 4 |

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A method of making a backing for a surface covering comprising obtaining recycled particles from a recycled carpet material by a process consisting of optional shearing, shredding, granulating, optionally elutriating, and grinding, and applying said recycled material in the form of particles on a substrate to form a layer, wherein said recycled material comprises a thermoplastic material;
and fusing said recycled particles to form a continuous backing layer.

2. The method of claim 1, wherein said fusing is achieved with the application of heat and optionally pressure.

3. The method of claim 1, wherein said fusing occurs in a double-belt press.

4. The method of claim 3, wherein the double-belt press comprises a bottom belt and a top belt, wherein said bottom belt is kept at a temperature from between about 110° to about 130° C. and said top belt is maintained at a temperature of from about 215° to about 220° C.

5. The method of claim 1, further comprising applying virgin thermoplastic material along with said recycled material to form a layer.

6. The method of claim 1, wherein said recycled particles after fusing substantially maintain their identity as particles on a microscopic level.

7. A method for preparing a backing for a surface covering comprising reducing vinyl backed carpet, vinyl backed carpet manufacturing waste, or both into granules and fibers;
separating at least a portion of the fibers from the granules;
reducing said granules to a smaller particle size to form a powder;
applying the powder to a substrate to form a layer and pressing said powder;
fusing said powder for a sufficient time and temperature in form a continuous backing.

8. The method of claim 7, wherein prior to reducing the vinyl backed carpet, vinyl backed carpet manufacturing waste, or both to granules, said process further comprises removing at least a portion of any face fiber from said vinyl backed carpet.

9. The method of claim 7, wherein said granules have a size of from about ¼" to about 3/16".

10. The method of claim 7, wherein said granules are formed by subjecting the vinyl backed carpet, vinyl backed manufacturing waste, or both to a shredder.

11. The method of claim 10, wherein said shredder reduces the vinyl backed carpet or the vinyl backed manufacturing waste to granules having sizes of from about 1" to about 2" wide.

12. The method of claim 7, wherein at least a portion of said fibers are separated from the granules using an aspirator with air stream separation.

13. The method of claim 7, wherein said granules are reduced to a powder by an ambient grinding process or a cryogenic grinding process.

14. The method of claim 7, wherein said substrate is positioned so that said substrate is a bottom surface of a primary backing, with textile fibers extending upwardly from the primary backing and forming a surface.

15. The method of claim 7, further comprising feeding a roll of primary backing onto a belt prior to applying the powder, applying dispersion grade or suspension grade thermoplastic resins onto the back of the primary backing to form an adhesive or polymeric pre-coat layer;

vibrating the primary backing;

reducing the adhesive or polymeric pre-coat layer to a soft gel;

placing a reinforcement material on the bottom surface of the adhesive or polymeric pre-coat layer and applying pressure, and wherein the powder is applied onto the bottom surface of the reinforcement material.

16. The method of claim 7, wherein said continuous backing is passed through cooling zone.

17. The method of claim 7, wherein said fusing occurs on a double-belt press.

18. A method of making a surface covering comprising forming an adhesive or polymeric pre-coat layer onto a primary backing by fusing or melting particles comprising a first thermoplastic material;

forming a secondary backing layer on said adhesive or polymeric pre-coat layer by fusing or melting particles comprising a second thermoplastic material, wherein said first and second thermoplastic material are the same or different.

19. The method of claim 18, wherein said first thermoplastic material and said second thermoplastic material comprises polyvinyl chloride particles.

20. The method of claim 18, wherein prior to forming the secondary backing layer, a reinforcement material is placed in between the adhesive or polymeric pre-coat layer and the secondary backing layer.

21. The method of claim 18, further comprising applying an intermediate layer of particles comprising a thermoplastic material after applying the adhesive or pre-coat layer, and then placing a reinforcement material onto the formed intermediate layer prior to the formation of the secondary backing layer.

22. A method of making a vinyl floor surface covering comprising forming a substrate from recycled thermoplastic particles; and applying on a surface of the substrate a wear layer comprising vinyl-based particles; and subjecting the two layers to sufficient heat and optionally pressure to form continuous layers which are adhered to one another.

* * * * *

UNITED STATES PATENT AND TRADEMARK OFFICE
CERTIFICATE OF CORRECTION

PATENT NO. : 6,936,201 B2
DATED : August 30, 2005
INVENTOR(S) : Desai et al.

It is certified that error appears in the above-identified patent and that said Letters Patent is hereby corrected as shown below:

Title page,
Item [56], References Cited, insert
-- OTHER PUBLICATIONS
"International Search Report for PCT/US99/02182 mailed June 30, 1999.
Addedo et al., "Man-Made Fiber" Chemiefasern/Textilindustrie, Vol. 41 (1991) October, No. 10, pp. 1235-1236. --.

Column 13,
Line 12, change "cooling zone" to -- a cooling zone --.

Signed and Sealed this

First Day of November, 2005

JON W. DUDAS
*Director of the United States Patent and Trademark Office*